United States Patent [19]

Tomita

[11] Patent Number: 4,654,719
[45] Date of Patent: Mar. 31, 1987

[54] CODING CIRCUIT FOR FACSIMILE APPARATUS

[75] Inventor: Yasuharu Tomita, Tokyo, Japan

[73] Assignee: NEC Corporation, Japan

[21] Appl. No.: 546,401

[22] Filed: Oct. 31, 1983

[30] Foreign Application Priority Data

Oct. 30, 1982 [JP] Japan .............................. 57-190027

[51] Int. Cl.⁴ ........................ H04N 1/419; H04N 7/12
[52] U.S. Cl. .................................. 358/261; 358/135; 358/136; 358/260
[58] Field of Search ............... 358/133, 135, 136, 260, 358/261

[56] References Cited

U.S. PATENT DOCUMENTS

| 4,097,903 | 6/1978 | Nakagome et al. | 358/261 |
| 4,115,815 | 9/1978 | Nakagome et al. | 358/260 |
| 4,212,036 | 7/1980 | Nakagome et al. | 358/261 |
| 4,245,257 | 1/1981 | Yamazaki et al. | 358/260 |
| 4,425,582 | 1/1984 | Kadakia et al. | 358/260 |
| 4,486,784 | 12/1984 | Abraham et al. | 358/260 |

OTHER PUBLICATIONS

CCITT Recommendation T.4; Telegraph and Telematic Service Terminal Eqipment recommendations of the S and T Series vol. VII, Fascicle VII.2, CCITT (1981), pp. 222-235.

Primary Examiner—Douglas W. Olms
Assistant Examiner—Wellington Chin
Attorney, Agent, or Firm—Laff, Whitesel, Conte & Saret

[57] ABSTRACT

An encoding circuit for a facsimile apparatus has an address-controllable memory for storing a video signal on a scan line which is being encoded. Two line memories alternately store a line of video signals which are read from the memory every time that the encoding of one scan line is completed. A write address counter transfers the video signals from the memory into one of the line memories, pixel by pixel. A circuit checks the video signals to detect a changing pixel. By comparing addresses in two succesive lines indicative of changing pixels, the signals are read out for facsimile transmission.

9 Claims, 21 Drawing Figures

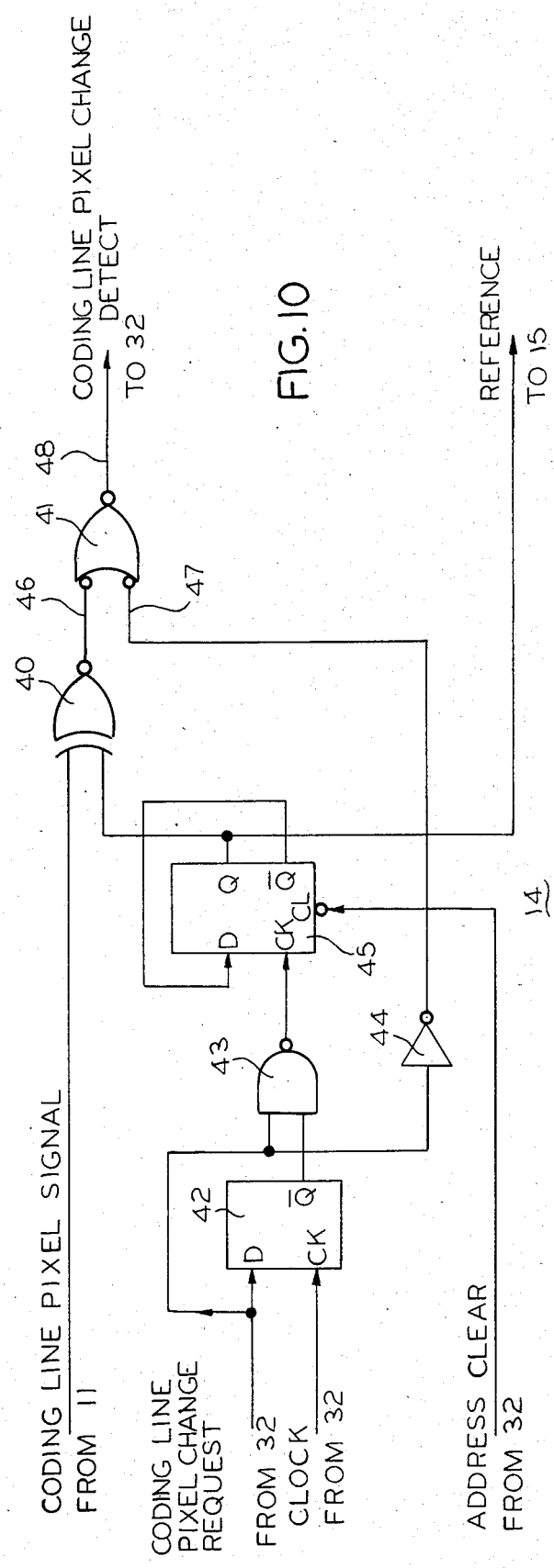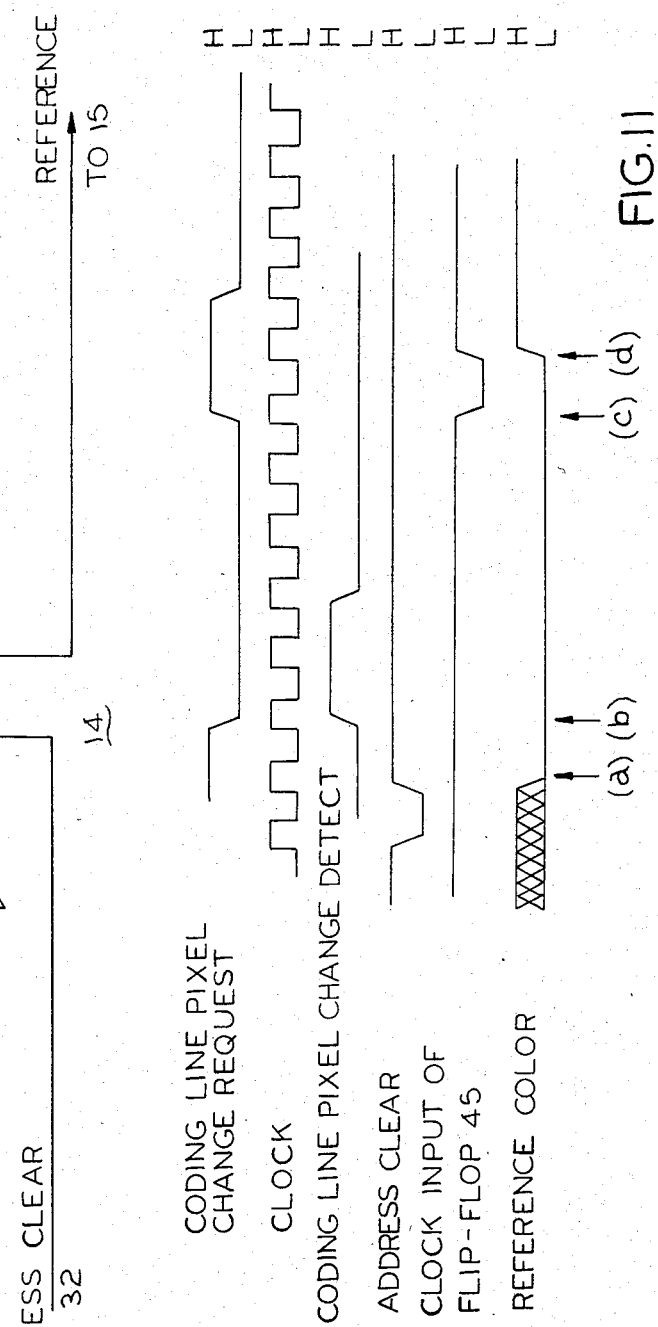

4,654,719

CODING CIRCUIT FOR FACSIMILE APPARATUS

BACKGROUND OF THE INVENTION

The present invention relates to a coding circuit for a facsimile apparatus and, more particularly, to a circuit for encoding facsimile data by sequentially utilizing an interrelationship between the position of a changing picture element of a scan line which is being encoded and the position of a changing picture element on the scan line which is immediately preceding the line being coded.

Two-dimensional coding methods used heretofore for a facsimile apparatus include the two-dimensional, sequential processing, relative address coding method which utilizes an interrelation between a picture element or pixel on a currently coding scan line and a pixel on the preceding scan line. An example of such a method is the modified READ (Relative Element Address Designate) coding method which is the standard coding method for group 3 facsimile apparatus for document transmission according to the CCITT Recommendation T.4 (new) (see, "Telegraph and Telematic Services Terminal Equipment, Recommendations of the S and T Series," Vol. VII-Fascicle VII.2, CCITT, (1981), pp. 225-235).

A prior art circuit for the two-dimensional, sequential processing, relative address coding system includes a shift register for shifting, pixel by pixel, a video signal on a scan line which is being encoded, ("coding line"). A shift register is also used for shifting, pixel by pixel, a video signal on the immediately preceding scan line, ("reference line"). Such a prior art circuit is found in Japanese Patent Application Disclosure Sho 56-73974, issued June 19, 1981. A problem is encountered with this prior art coding circuit because the whole video signal on the reference line is shifted by the shift register for the detection of changing pixels. A substantial period of time is required for the detection of changing pixels on a reference line. As a result, there is a limitation on the speed available for the processing.

SUMMARY OF THE INVENTION

It is, therefore, an object of the invention to provide an encoding circuit for a facsimile apparatus which eliminates the above-described problem that is inherent in the prior art device. Another object is to enable the apparatus to perform high-speed data processing.

In accordance with the present invention, an encoding circuit for a facsimile apparatus comprises an address-controllable memory for storing a video signal of a scan line which is being encoded. Two line memories alternately store one line of video signal as it is read from the memory, every time that encoding of one scan line is completed. A write address counter controls the writing of the video signal output from the memory into one of the line memories, this writing being pixel by pixel. A read address counter controls the reading of a video signal on the immediately preceding scan line, which is written into the other of the two line memories by the write address counter. A selector causes the writing by the write address counter and the reading by the read address counter to occur alternately every time that an encoding of one line is completed. A circuit checks a video signal which is delivered thereto from the memory to detect a first changing pixel. Another circuit checks a video signal read by the read address counter to detect a second changing pixel. A relative address is produced by comparing an address in the write address counter which is indicative of a position of the first changing pixel and another address in the read address counter which is indicative of a positive of the second changing pixel. The address in the write address counter is loaded into the read address counter when the relative address satisfies a predetermined condition.

BRIEF DESCRIPTION OF THE DRAWINGS:

FIG. 10 illustrates a block diagram of a coding line pixel change detector for use in the present invention;

FIG. 11 illustrates a timing chart of a coding line pixel change detector;

DETAILED DESCRIPTION OF THE EMBODIMENT

Before entering into a detailed discussion of the present invention, the modified READ coding method will be described. This method is applicable to the invention and is defined in the previously mentioned CCITT reference.

The modified READ coding system is a line-by-line encoding system in which the position of each changing pixel on the current coding line is encoded with respect to the position of a corresponding reference pixel situated on either the coding line, or the reference line which lies immediately above the coding line. After the coding line has been encoded, it becomes the reference line for the next coding line.

Figure 1:
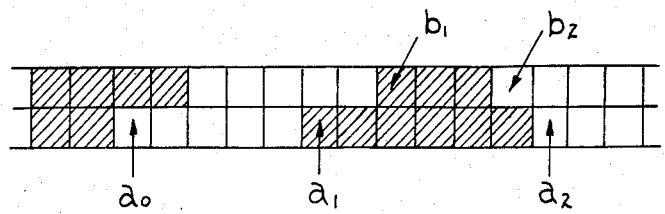
FIG. 1 shows changing pixels in a data compression system to which the present invention is applicable.

(i) DEFINITION OF CHANGING PIXEL (SEE, FIG. 1)

A changing pixel is defined as an element whose "color" (i.e. black or white) is different from that of the previous element along the same scan line.

In FIG. 1:

$a_0$; The reference or starting of changing pixel on the coding line. At the start of the coding line $a_0$ is set on an imaginary white changing pixel situated just before the first element on the line. During the encoding of the coding line, the position of $a_0$ is defined by the previous coding mode.

$a_1$; The next changing pixel, to the right of $a_0$, on the coding line.

$a_2$; The next changing pixel, to the right of $a_1$, on the coding line.

$b_1$; The first changing pixel on the reference line, to the right of $a_0$, and opposite in color to $a_0$.

$b_2$; The next changing element, to the right of $b_1$, on the reference line.

(ii) DEFINITION OF CODING MODES

One of the three coding modes are chosen according to the coding procedure described in item (iii). This mode will be followed, to encode the position of each changing element along the coding line.

Figure 2:
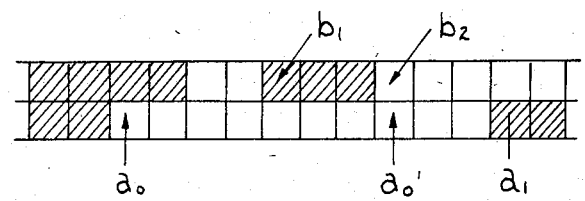
FIG. 2 shows a pass mode in modified READ coding.
Figure 3:
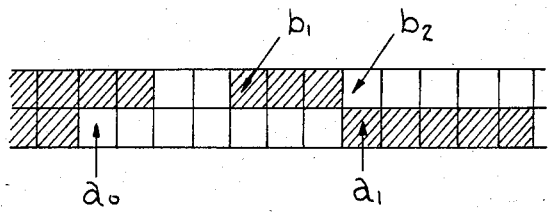
FIG. 3 shows an example which is not identified as the pass mode in a modified READ coding.
Figure 4:
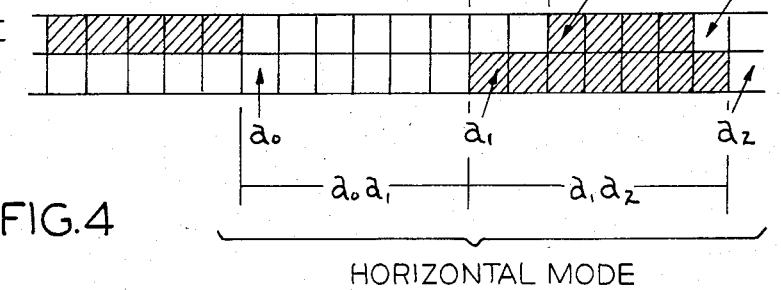
FIG. 4 shows a vertical mode and a horizontal mode in modified READ coding.

Examples of the three coding modes are given in FIGS. 2, 3 and 4.

i. Pass Mode

This mode is identified when the position of pixel $b_2$ lies to the left of $a_1$. When this mode has been encoded, $a_0$ is set on the pixel of the coding line below $b_2$ in preparation for the next coding (i.e. on $a'_0$) (FIG. 2). However, if pixel $b_2$ occurs immediately above $a_1$, as shown in FIG. 3, it is not considered as the pass mode.

ii. Vertical Mode

When this mode is identified, the position of pixel $a_1$ is encoded relative to the position of pixel $b_1$. The relative distance $a_1b_1$ can take one of seven values $V(0)$, $V_R(1)$, $V_R(2)$, $V_R(3)$, $V_L(1)$, $V_L(2)$ and $V_L(3)$, each of which is represented by a separate code word. The subscript R and L indicate the pixel $a_1$ is to the right or left respectively of pixel $b_1$. The number in brackets indicates the value of the distance $a_1b_1$. After vertical mode coding has occurred, the position of $a_0$ is set on $a_1$ (see FIG. 4).

iii. Horizontal Mode.

When this mode is identified, both the run-lengths $a_0a_1$ and $a_1a_2$ are encoded using the code words $H+M(a_0a_1) M(a_1a_2)$. H is the flag code word 001 taken from the two-dimensional code table (Table 1), which will appear later. $M(a_0a_1)$ and $M(a_1a_2)$ are code words which represent the lengths and "colors" of the runs $a_0a_1$ and $a_1a_2$, respectively, and comprise appropriate white or black modified Huffman code words. After horizontal mode encoding, the position of $a_0$ is set on $a_2$ (see FIG. 4).

(iii) Coding Procedure.

The code procedure identifies the coding mode that is to be used to encode each changing pixel along the coding line. When one of the three coding modes has been identified according to Step 1 or Step 2, an appropriate code word is selected from the code table given in Table 1.

Figure 5:
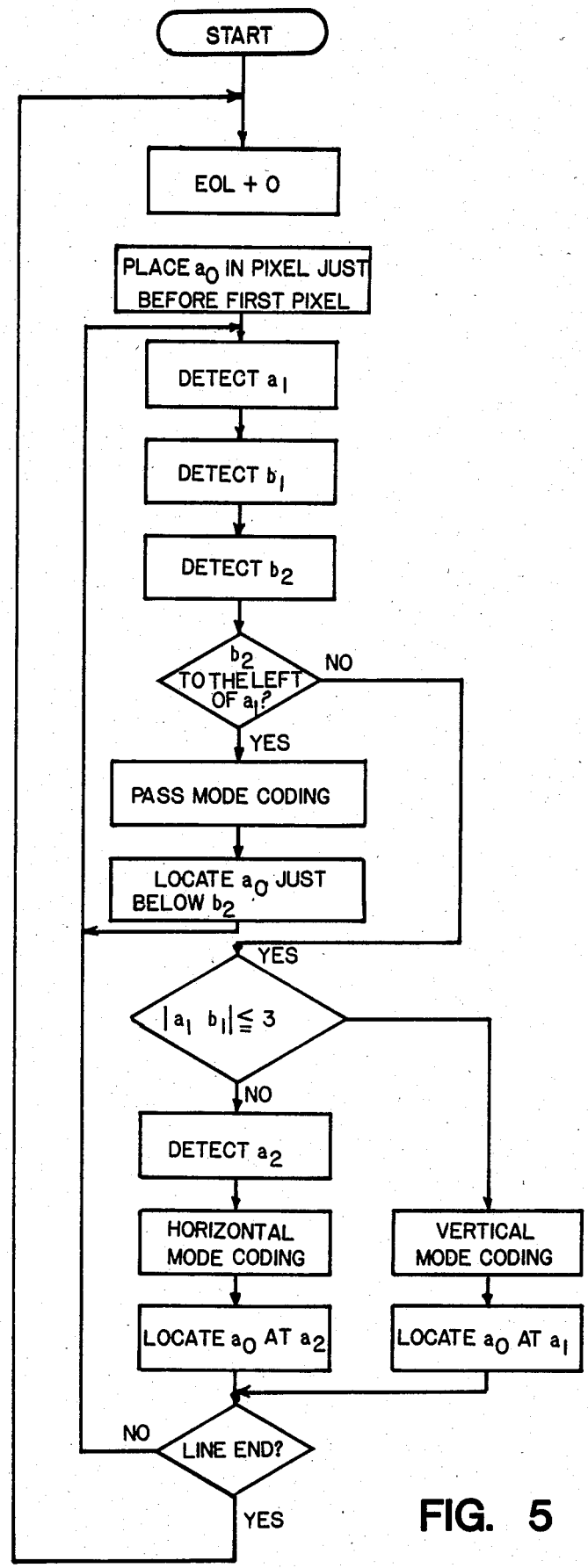
FIG. 5 is a flow chart showing a modified READ coding.

The coding proceding is as shown in flow diagram of FIG. 5.

Step 1:

i. If the pass mode is identified, it is encoded using the word 0001 (Table 1). After the processing, pixel $a'_0$ just under $b_2$ is regarded as the new starting pixel $a_0$ for the next encoding (see FIG. 2).

ii. If the pass mode is not detected, then the operation proceeds to Step 2.

Step 2:

i. The absolute value of the relative distance $a_1b_1$ is determined. As shown in Table 1, if $a_1b_1 \leq 3$, $a_1b_1$ is encoded by the vertical mode. Position $a_1$ is then regarded as the new starting pixel $a_0$ for the next coding. Following horizontal mode code 001, if $a_1b_1 > 3$, $a_0a_1$ and $a_1a_2$ are respectively encoded by one-dimensional coding. After this processing, position $a_2$ is regarded as the new starting pixel $a_0$ for the next coding.

(iv) Processing the first and last pixels on a line i. Processing the first pixel The first starting pixel $a_0$ on each coding line is imaginarily set at a position just before the first picture element, and is regarded as a white pixel. The first run-length on a line $a_0a_1$ is replaced by $a_0a_1-1$. Therefore, if the first run is black and is deemed to be encoded by a horizontal mode coding, then the first code word $M(a_0a_1)$ corresponds to a white run of zero length.

ii. Processing the last pixel

The encoding of the coding line continues until the position of the imaginary changing pixel situated just after the last actual element has been encoded. This may be encoded as $a_1$ or $a_2$. Also, if $b_1$ and, or $b_2$ are not detected at any time during the encoding of the line, they are positioned on the imaginary changing pixel situated justed after the last actual pixel on the reference line.

Line Synchronization Code Word

To the end of every coded line is added the end-of-line (EOL) code word 000000000001. The EOL code word is followed by a single tag bit which indicates whether one or two-dimensional coding is used for the next line. Two-dimensional coding proceeds line-by-line considering a correlationship between the lines. Thus, any error renders the whole information erroneous in the coding of the following lines. For this reason, one-dimensional coding precedes two-dimensional coding once for every predetermined number of lines. The format EOL+0, therefore, teaches that the next line will be subjected to two-dimensional coding.

TABLE 1

Two-dimensional code table

| Mode | Elements to be coded | | Notation | Code Word |
|---|---|---|---|---|
| Pass | $b_1, b_2$ | | P | 0001 |
| Horizontal | $a_0a_1, a_1a_2$ | | H | 001 + $M(a_0a_1)$ + $M(a_1a_2)$ (see Note 1) |
| Vertical | $a_1$ just under $b_1$ | $a_1b_1 = 0$ | $V(0)$ | 1 |
| | $a_1$ to the right of $b_1$ | $a_1b_1 = 1$ | $V_R(1)$ | 011 |
| | | $a_1b_1 = 2$ | $V_R(2)$ | 000011 |
| | | $a_1b_1 = 3$ | $V_R(3)$ | 0000011 |
| | $a_1$ to the left of $b_1$ | $a_1b_1 = 1$ | $V_L(1)$ | 010 |
| | | $a_1b_1 = 2$ | $V_L(2)$ | 000010 |
| | | $a_1b_1 = 3$ | $V_L(3)$ | 0000010 |

Note 1 - Code M( ) of the horizontal mode represents modified Huffman code words.

To facilitate an understanding of the present invention, a brief reference will be made to a prior art coding circuit using the modified READ method, illustrated in FIG. 6.

Figure 6:
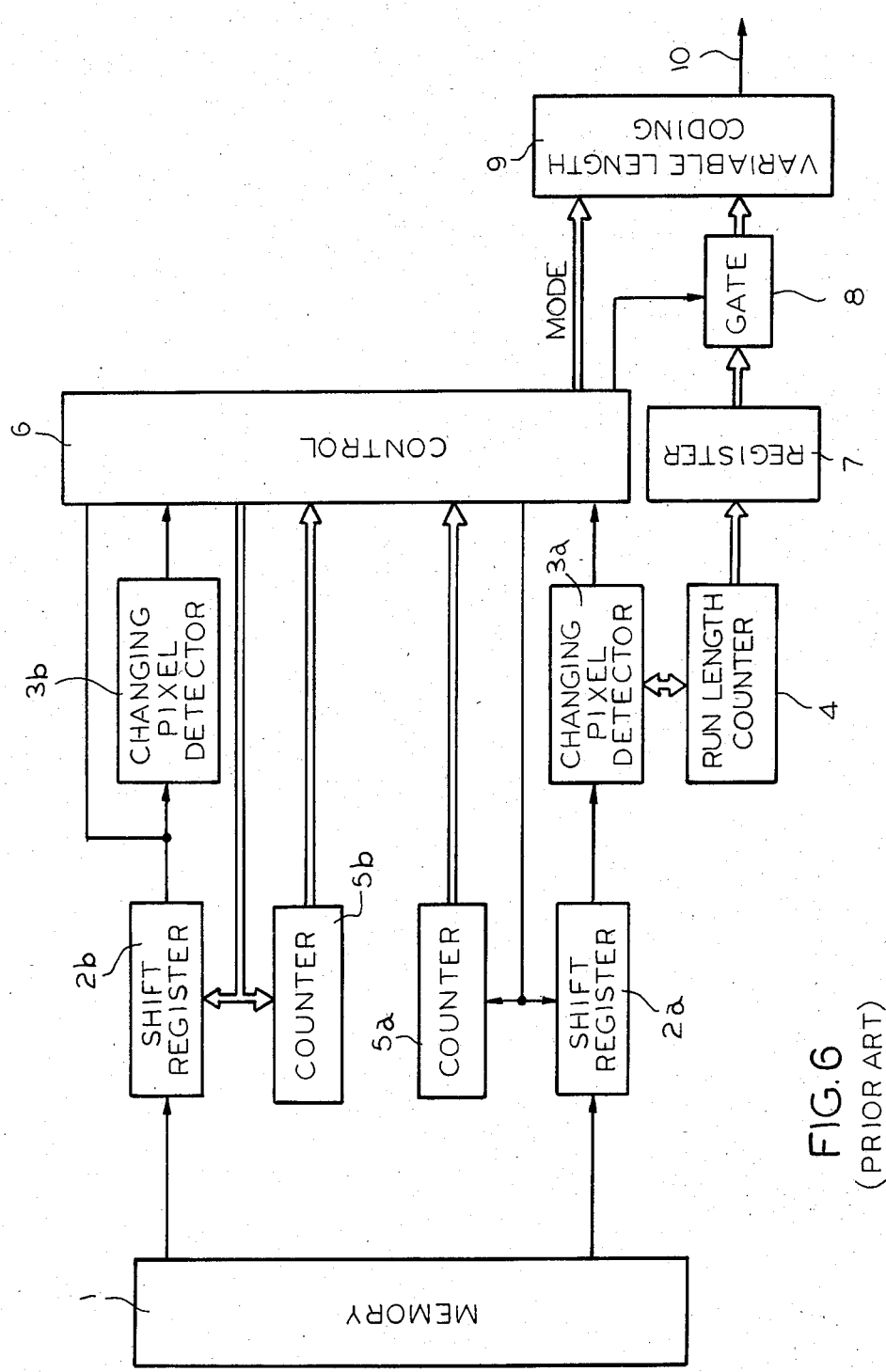
FIG. 6 is a block diagram of a prior art coding circuit employing the modified READ coding system.

In FIG. 6, the coding circuit includes a memory 1 for storing two-dimensional video signals read from a document. Shift registers 2a and 2b are connected to the memory 1 in order to individually store one line of video signal (hereinafter, suffix a corresponds to the coding line and suffix b to the reference line). The shift registers 2a, 2b supply the video signals, pixel by pixel, to changing pixel detector circuits 3a and 3b, respectively. Circuits 3a, 3b determine whether or not each pixel is different from the immediately preceding one.

A run-length counter circuit 4 is adapted to respond to detector 3a and count pixels which appear from the instant of detection of the next changing pixel, i.e. the "run-length". Counter circuits 5a and 5b are connected to the first registers 2a and 2b, respectively.

Each of the counter circuits 5a and 5b counts the number of shifts of its associated shift register 2a and 2b, i.e. the position of the pixel at the outlet of the shift register as counted from the left end of each line. A control circuit 6 generates shift pulses for the shift registers 2a and 2b, as well as others, and has latches inside for respectively latching addresses supplied thereto from the counters 5a and 5b. Further included in the FIG. 6 coding circuit are a register 7 for temporarily storing run-length information provided by the run-length counter 4, a gate 8, a variable length coding circuit 9 for performing variable length coding such as shown in Table 1, and an output terminal 10.

Referring to FIG. 5 together with FIG. 6, video signals stored in the memory 1 are sequentially read out, line by line, to the shift register 2a. A video signal in the reference line, i.e., the line just before the line stored in the shift register 2a, has been stored in the shift register 2b. The shift register 2b which thus supplies a reference signal remains deactivated while the signal in the shift register 2a is encoded. The signal on the coding line stored in the shift register 2a, is sequentially shifted in response to shift pulses supplied by the control circuit 6 and, thereby, fed out to the changing pixel detector 3a, pixel by pixel, from the left end of the coding line.

The detector 3a constantly checks to determine whether each incoming pixel differs from the immediately preceding pixel. The counter 5a indicates how many times the shift register 2a has been shifted, i.e. the position of a pixel fed from the shift register 2a to the detector 3a, as counted from the left end of the line. On detection of a change of the video signal from a white pixel to a black pixel or vice versa, the detector 3a supplies a pulse to the control circuit 6 which is indicative of the detection. Detector 3a also supplies a signal which is indicative of a direction of the change, i.e. whether the change is from white to black or black to white. Then, the control circuit 6 stops the supply of shift pulses to the shift register 2a to thereby deactivate it. At this moment, the run-length counter 4 is indicating the number of pixels between the immediately preceding changing pixel and the currently changing pixel, or the "run-length".

In FIG. 1, assume that the pixels down to the changing pixel $a_0$ have already been encoded and that the position, or address, of the changing pixel $a_1$ is to be encoded. The control circuit 6 delivers shift pulses to the shift register 2a to sequentially shift it until the detector 3a detects the changing pixel $a_1$. As soon as the detector 3a detects the pixel $a_1$, the control circuit 6 stops supplying pulses to the shift register 2a and, instead, starts supplying shift pulses to the shift register 2b. When the detector 3b associated with the shift register 2b has detected a reference changing pixel, the control circuit 6 stops the supply of shift pulses to the shift register 2b and reads the address of the reference changing pixel $b_1$ out of the counter 5b. Then, the control circuit 6 compares the content of the counter 5a (i.e., absolute address of the changing pixel $a_1$) with the content of the counter 5b (i.e., absolute address of the changing pixel $b_1$). Assuming that the content of the counter 5b is $X(b_1)$ and that of the counter 5a is $Y(a_1)$, and if $X(b_1)-Y(a_1)>3$, the control circuit 6 causes the variable length coder 9 to generate a horizontal mode code. Then, gate 8 conducts to feed the run-length $a_0a_1$ stored in the register 7 to the coder 9. The cotnrol circuit 6 again delivers shift pusles to the shift register until the detector 3a detects the changing pixel $a_2$. On detection of the pixel $a_2$ the control circuit 6 stops supplying pulses and controls the gate 8 which feeds the run-length $a_1a_2$ stored in the register 7 to coder 7.

If $X(b_1)-Y(a_1)\leq 3$, the control circuit 6 supplies shift pulses to the shift register 2b and stops the supply of such shift pulses on the detection of a changing pixel $b_2$ by the detector 3b. At this moment, if the relative address of the absolute address $X(b_2)$ of the new changing pixel and the address $Y(a_1)$ is smaller than zero, $X(b_2)-Y(a_1)<0$, the coder 9 encodes the pass mode code. If $X(b_2) - Y(a_1)$ 0 and $3\geq Y(b_1)-Y(a_1)\geq -3$, the coder 9 generates the vertical mode code. Further, if $X(b_2)-Y(a_1)\geq 0$ and $X(b_1)-Y(a_1)\leq -3$, the horizontal mode is generated. After such coding in any one of the modes, the content of either one of the counters 5a and 5b is latched in a register (not shown) incorporated in the control circuit 6.

This completes the cycle which repeats upon the detection of a new starting pixel $a_0$ and then the detection of the next changing pixel.

Figure 7:
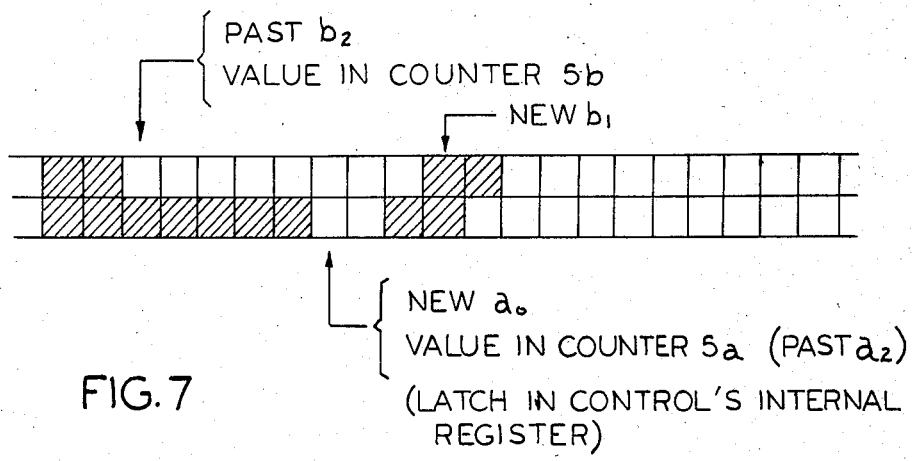
FIG. 7 shows changing pixels in a data compressing system.

For example, to encode pixels occurring as shown in FIG. 7, that is, to detect a new changing pixel $b_1$ on a reference line after coding in the horizontal mode, the control circuit 6 has to supply eight shift pulses to the shift register 2b. Therefore, even if the address in the counter 5a clearly shows that the position of the past changing pixel $b_2$ is to the left of the new starting pixel $a_0$, the address in the counter 5b cannot be shifted to the address of the pixel just above the starting pixel $a_0$ unless the shift pulse generator 6 delivers five pulses to the shift register 2b. Obviously, therefore, a period of time which is long enough to fully shift one line of pixels is required for each line in order that one line of changing pixels on the reference line may be detected to be processed. Such a drawback cannot be eliminated as long as use is made of a shift register.

Figure 8:
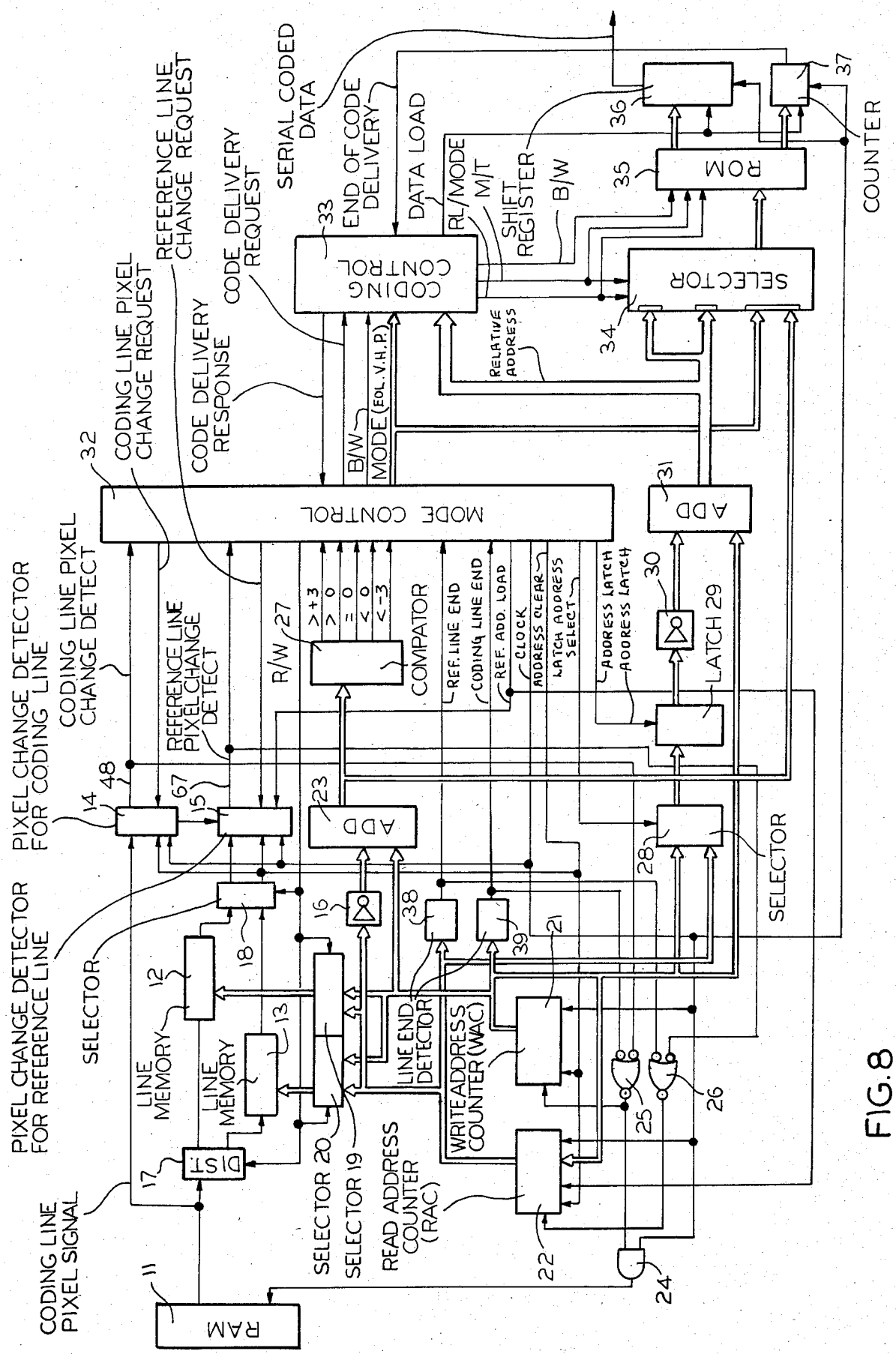
FIG. 8 is a block diagram showing a coding circuit embodying the present invention.

FIG. 8 shows a coding circuit embodying the present invention. A memory (e.g., a RAM) 11 has an address control capability. The memory 11 stores a video signal which is being encoded. The addresses in the RAM memory are controlled by a read clock to deliver the video signal one pixel at a time. Line memories 12 and 13 are individually capable of storing one line of video signal which is output, pixel by pixel, from the memory (e.g., a RAM) 11.

A pixel change detector for encoding line 14 receives the video signal from the memory 11 one pixel at a time and determines whether each pixel differs from the immediately preceding pixel. Meanwhile, a pixel change detector 15 for the reference line receives a video signal from the reference line stored in the line memory 12 or 13 to determine whether the received pixel differs from the immediately preceding one. Designated by the reference numeral 16 is an inverting gate.

The alternate supply of the video signal from the memory 11 to the ine memories 12 and 13 is effected by a distributor 17 which is supplied with an R/W signal. A selector 18 is adapted to selectively supply video signal on the reference line stored in the line memories 12 and 13 to the pixel change detector 15, in response to the R/W signal. Each of the selectors 19 and 20 is employed for supplying the line memory 12 or 13 with a read or write address in response to the R/W signal. The R/W signal for controlling the selectors 18, 19 and 20 and distributor 17 is switched every time one line of data is fully encoded.

A write address counter 21 enables a video signal output from the memory 11 to be written, pixel by pixel, onto one of the line memories 12 and 13 selected by the distributor 17. The counter 21 enabling signal is routed by way of the selector 19 or 20. A read address counter 22, on the other hand, enable a video signal to be read out of one of the line memories 12 and 13, and to be fed through the selector 18 to the pixel change detector 15. The counter 22 enabling signal is routed by way of the selector 19 or 20. The selectors 18, 19 and 20 and distributor 17 are interrelatedly controlled by the R/W signal. For example, when the distributor 17 has selected the line memory 12, the selector 18 selects the line memory 13. The selector 19 selects a write address delivered thereto which is from the write address counter 21. The selector 20 selects a read address which is delivered thereto from the read address counter 22. Every time that one line of data is fully encoded, the R/W signal is switched so that all the selectors 18, 19 and 20 and distributor 17 select the opposite circuits so that line memories 12, 13 reverse their read-write functions.

In FIG. 8, an adder 23 is supplied with an address either directly from the write address counter 21 or indirectly via the inverting gate 16, from the read address counter 22. The output of the adder 23 is a difference between the two different inputs, or relative address.

The read clock of the memory 11 is inhibited by an AND gate 24 when a changing pixel has been detected on the coding line or when an effective number of pixels on the coding line have been fully read out (end of one scan). The operation of the write address counter 21 is inhibited by an AND gate 25 when a changing pixel has been detected on the coding line or when an effective number of pixels on the coding line have been fully written. Further, the operation of the read address counter 22 is inhibited by an AND gate 26 when a changing pixel has been found on the reference line or when an effective number of pixels have been fully read out.

A comparator 27 determines whether a relative address output from the adder 23 is not smaller than 4, not smaller than 1, 0, not larger than −1, or not larger than −4. A selector 28 responds to a latch address select signal, and switches an address from the write address counter 21 and an address from the read address counter 22, from one counter to the other counter. The address selected by the selector 28 is latched by an address latch 29 which is supplied with an address latch signal. An inverting gate 30 is adapted to invert and address which is latched by the address latch 29. The gate 30 is connected to an adder 31 which calculates a run-length.

A mode control circuit 32 is supplied with an output of the comparator 27 to discriminate a coding mode of the modified READ coding method, i.e., vertical, horizontal, or pass, as well as an end of line signal EOL, generating a coding request signal. The mode control circuit 32 is adapted to generate other various control signals as well. A coding control circuit 33 generates various control pulses for the delivery of mode and EOL codes.

A selector 34 receives in its input a 2-bit code for identifying a coding mode, V, H, P or EOL, supplied from the mode control circuit 32. A 4-bit code indicative of a relative address in the vertical mode is supplied from the adder 23. A lower six bits of a run-length in the horizontal mode, and an upper six bits of a run-length in the horizontal mode are supplied to selector 34 which selects one of them in response to a control signal which is supplied thereto from the coding control 33.

A read only memory (ROM) 35 is adapted to generate a code word and a bit number of the code word in response to an output of the selector 34. Memory 35 is controlled by a control signal from the coding control 33. The ROM 35 stores therein a table which is addressed by outputs of selector 34 and of the coding control circuit 33. These outputs of circuit 33 are an RL/Mode signal indicative of a run-length or a mode, an M/T signal indicative of make-up codes or terminating codes, and a B/W signal indicative of a run of black pixels or a run of white pixels.

In greater detail, when the selector 34 produces the EOL signal, it addresses a location in the ROM 35 table which stores the code bits previously discussed in conjunction with the sync signal, whatever the output of the adder 23 may be. The pass mode or the horizontal mode output from the selector 34 designates an address which stores the code word 0001 or 001 shown in Table 1, regardless of the output of the adder 23. The lower bits of a run-length output from the selector 34 selectively designates locations which store code words shown in Table 1/T.4, CCITT reference, P. 224, in accordance with th signals RL/Mode=RL, M/T=T and B/W. Further, the upper bits of a run-length output from selector 34 designate locations which store code words shown in Table 2/T.4, CCITT reference p. 225. The ROM also stores numbers of bits included in the respective locations. For the vertical mode, the ROM stores the codes in the vertical mode shown in Table 1, corresponding to the vertical mode and relative address information from the adder.

A parallel code word output from the ROM 35 is supplied to a shift register 36, to be converted therein into a serial code word. A presettable counter 37 is adapted to count the length of a code word supplied thereto from the ROM 35, thereby informing the coding control circuit 33 of the completion of a serial code word delivery from the shift register 36.

The operation of the mode control shown in FIG. 8 will be described hereinafter with reference to FIGS. 9(a), 9(b) and 9(c), as well.

First, the mode control circuit 32 generates an address clear pulse to make addresses in the write address counter 21 and read address counter 22 "0". Circuit 32 loads a reference white pixel in the pixel change detector 14 for the coding line and pixel change detector 15 for the reference line. Then, the mode control circuit 32 makes the mode signal "EOL" which is fed to the coding control 33, turns on the code delivery request signal, and waits until a code delivery response from the coding control 33 has been turned on.

As soon as the response signal becomes "on", the mode control circuit 32 turns on a coding line pixel change request signal and a reference line pixel change request signal to make the high level output of the pixel change detectors 14 and 15. Circuit 32 activates the write address counter 21 and read address counter 22, and reads a video signal out of the memory 11.

The detector 14 determines whether each pixel of the video signal fed thereto from the memory 11 is the same as or different from the immediately preceding pixel. If it is different, detector 14 makes a coding line pixel change detection signal at a low level to indicate the change to the mode control circuit 32. At the same time, the detector 14 deactivates the write address counter 21 to interrupt the read operation of the video signal out of the memory 11. The mode control circuit 32 responds to the low level of the coding line pixel change detection signal only when the coding line pixel change request signal is on, and not when it is off.

Likewise, the pixel change detector 15 for the reference line determines whether each pixel of the video signal read pixel by pixel by the address counter 22 is the same as or different from the immediately preceding one. If it is different, detector 15 turns on the reference line pixel change detection signal to indicate the change to the mode control 32, while deactivating the read address counter 22.

It should be remembered that when a line end signal has turned on before its associated pixel change detection signal is turned on, it is regarded that a changing pixel has been detected at that instant, and the operation advances to the next step. The end of line is detected by a line end detector 38 or 39 comprising a decoder which monitors respectively an output of the read address counter 22 or an address of the write address counter 21 and produces an output when an output of the associated counter is equal to the line length. The mode control circuit 32 checks an output of the comparator 27 when both the coding line pixel change detection signal (or coding line end signal) and the reference line pixel change detection signal (or reference line end signal) have been turned on.

Figure 9A:
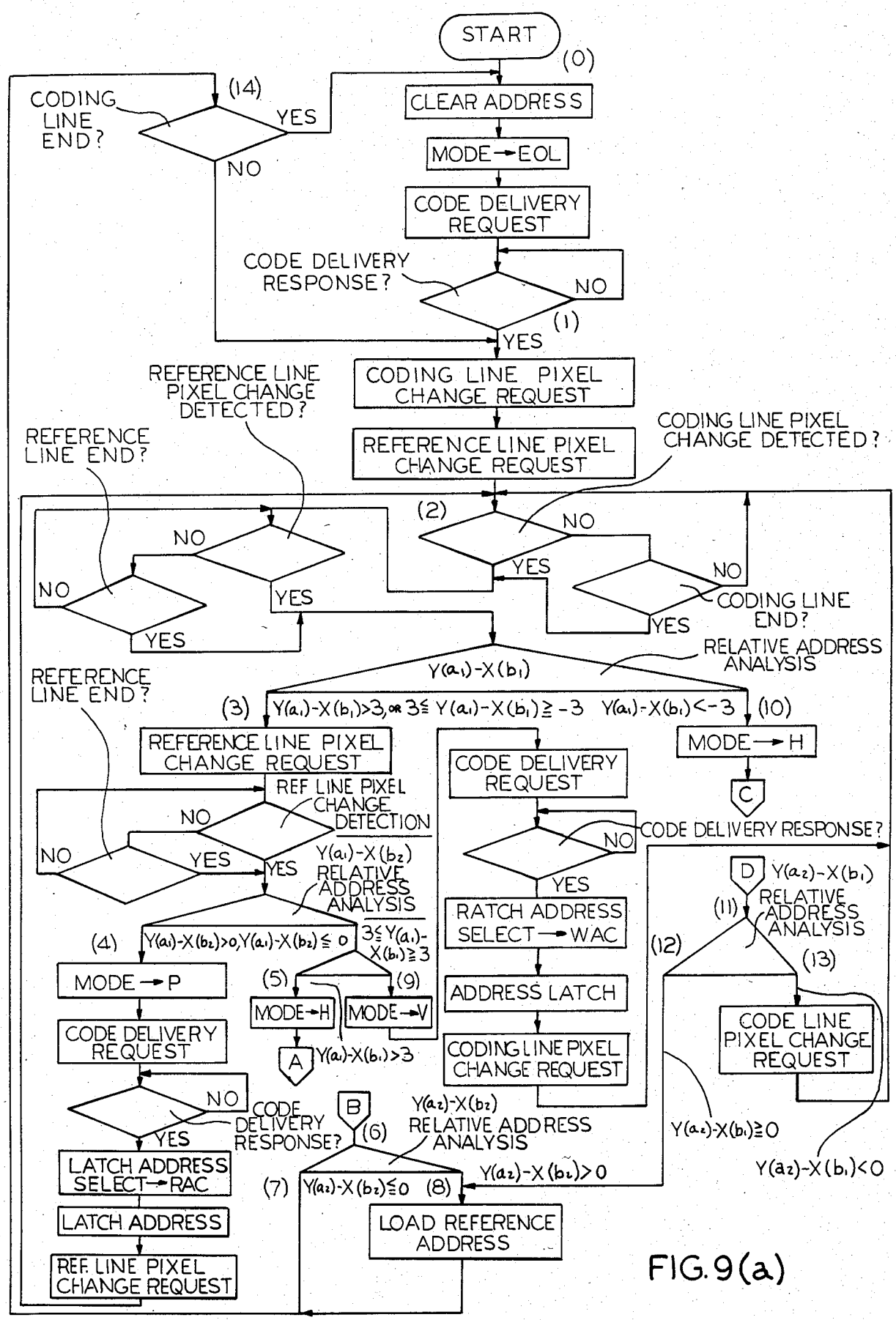
FIGS. 9(a) and 9(c) are flow charts demonstrating the operation of a mode control circuit shown in FIG. 8.

If the result of a comparison between an address $Y(a_1)$ in the write address counter 21 and an address $X(b_1)$ in the read address counter 22 is $Y(a_1)-X(b_1)>3$ or $3 \geq Y(a_1)-X(b_1) \geq -3$, that is, in a status (3) shown in FIG. 9(a) where $Y(a_1)-X(b_1) \geq -3$, the output of the comparator 27 is entered into a flip-flop (not shown) disposed in the mode control circuit 32. This entry is made while the reference line pixel change request signal is turned on to activate the read address counter 22. Thereafter, the output of the comparator 27 is checked as soon as the reference line pixel change signal from the detector 15 (or reference line end signal) is turned on.

If $Y(a_1)-X(b_2)>0$ (see FIG. 9(d)) as in a status (4) in FIG. 9(a), the mode control circuit 32 determines that the coding mode is the pass mode, makes the mode signal to the coding control 33 circuit "pass", and turns on the code delivery request signal. When the code delivery response signal from the coding control circuit 33 has been turned on, the mode control circuit 32 switches the selector 28 to the read address signal by giving a latch address select signal. An address latch signal latches the read address $X(b_2)$ in the address latch 29 as the address of the new starting pixel $a_0$, in preparation for the next coding operation. Thereafter, the mode control circuit 32 returns to a status (2) shown in FIG. 9(a) after turning on the reference line pixel change detection signal.

Meanwhile, a status (3) shown in FIG. 9(a) where $Y(a_1)-X(b_1) \geq -3$ is followed by turning on the reference line pixel change request signal to activate the address counter 22. When the reference line pixel change detection signal from the pixel change detector 15 (or reference line end signal) has been turned on, the mode control circuit 32 checks the output of the comparator 27. If the comparator output indicates a shift to a status (5) in FIG. 9(a) where $Y(a_1)-X(b_2) \leq 0$, the mode control circuit 32 sees the signal stored in its flip-flop (not shown). If $Y(a_1)-X(b_2)>3$, circuit 32 determines that the coding mode is the horizontal mode, and turns the mode signal supplied to the coding control circuit 33 into "horizontal", and then advances to the operation shown in FIG. 9(b) to turn on the code delivery request signal.

Figure 9B:
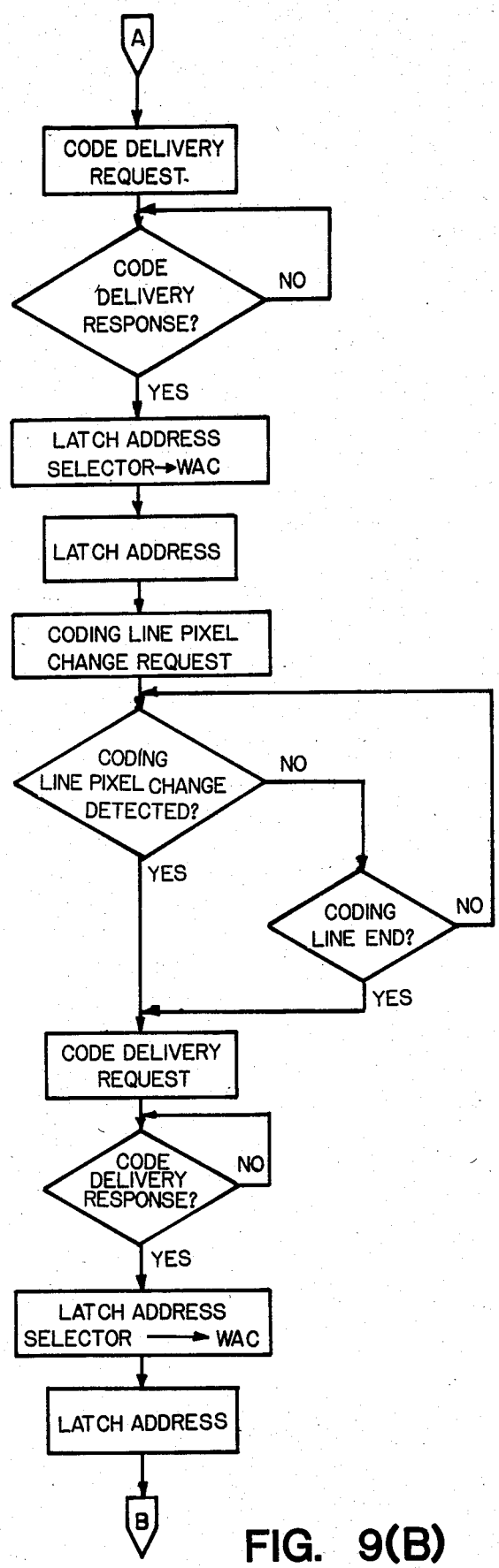
FIGS. 9(d), 9(e), 9(f), 9(g), 9(h) and 9(i) show examples of changing pixels.

Referring to FIG. 9(b), the coding control circuit 33 loads the shift register 36 with the horizontal mode code (001 in Table 1) and the run-length code of $a_0a_1$ (M $(a_0a_1)$ in Table 1) which have been stored in the ROM 35. Thereafter, circuit 33 turns on the code delivery response signal. Then, the mode control circuit 32 switches the selector 28 to the write address side responsive to the latch address select signal and latches the write address $Y(a_1)$ in the address latch 29 responsive to the address latch signal.

Under this condition, the mode control circuit 32 turns on the coding line pixel change request signal to read the video signal out of the memory 11, while activating the wire address counter 21. As soon as the coding line pixel change detection signal from the detector 14 (or coding line end signal) is turned on, the mode control circuit 32 turns on the code delivery request signal to the coding control 33, thereby requesting an encoding of the run-length $a_1a_2$(M $(a_1a_2)$ shown in Table 1). In response to the turn-on of the code delivery response signal from the coding control circuit 33, the mode control circuit 32 switches the selector 28 to the write address side by the latch address select signal. Then, selector 28 latches the write address $Y(a_2)$ as a new starting pixel $a_0$ in the address latch 29 responsive to the address latch signal. The operation shifts to a status (6) shown in FIG. 9(a).

In FIG. 9(a), the mode control circuit 32 checks the output signal of the comparator 27 and, if $Y(a_2)-X(b_2) \leq 0$, (see FIG. 9(e)) as shown in a status (7), advances to a status (14). If $Y(a_2)-X(b_2)>0$, (see FIG. 9(f)) as shown in a status (8), the mode control circuit 32 reads an address $Y(a_2)$ in the write address counter 21 in response to the reference address load signal to load address $Y(a_2)$ into the read address counter 22. Simultaneously, a reference color from the coding line pixel change detector 14 is loaded into the reference line pixel change detector 15, thereby preparing for the detection of the next changing pixel on the reference line. This is followed by the status (14).

The mode control circuit 32 sees an output of the comparator 27. If $Y(a_2)-X(b_2)>0$, that is, if the address $Y(a_2)$ in the write address counter 21 which is indicative of the position of the coding line changing pixel $a_2$ is larger than the address $X(b_2)$ in the address counter 22 which is indicative of the position of the reference line changing pixel $b_2$, the mode control circuit 32 loads the read address counter 22 with the address $Y(a_2)$ of the write address counter 21. This shortens the period of time required for detecting a changing pixel in the reference line, as compared to the prior art system which reads a video signal on a reference line pixel by pixel by means of a shift register.

In the status (14) shown in FIG. 9(a), the mode control circuit 32 checks the coding line end signal and, if it is on, shifts to a status 0 to start encoding the next line while, if it is off, shifting to a status 1.

By the procedure described, the mode control circuit 32 advances from the status (3), $Y(a_1) - X(b_1) \geq -3$, of FIG. 9(a) to the status $Y(a_1) - X(b_2) \leq 0$. Then, the mode control circuit 32 sees the signal stored in its internal flip-flop (not shown). If $3 \geq Y(a_1) - X(b_1)) \geq -3$ (see FIG. 9(g)) as shown in a status (9) mode control circuit 32 determines that the coding mode is the vertical mode, makes the mode signal supplied to the coding control circuit 33 "vertical", and then turns on the code delivery request signal. As the code delivery response signal from the coding control circuit 33 becomes "on", the mode control circuit 32 switches the selector 28 to the write address side in response to the latch address select signal, and latches the write address $Y(a_1)$ in the address latch 29 as the address of the new starting pixel $a_0$. Latch circuit 29 is set in response to the address latch signal. Thereafter, the mode control circuit 32 turns on the coding line pixel change request signal and then returns to the status (2).

The mode control circuit 32 has turned on the coding line pixel change request signal and the reference line pixel change request signal at the status (1) in FIG. 9(a). When both the coding line pixel change detection signal (or the coding line end signal) and the reference line pixel change detection signal (or reference line end signal) have been turned on, circuit 32 checks an output of the comparator 27. If the operation has advanced to a status (10) in FIG. 9(a), due to a relationship $Y(a_1) - X(b_1) < -3$, the mode control circuit 32 determines that the coding mode is the horizontal mode, makes the mode signal supplied to the coding control 33 "horizontal", and enters into the operation shown in FIG. 9(c), to turn on the code delivery request signal.

Figure 9C:
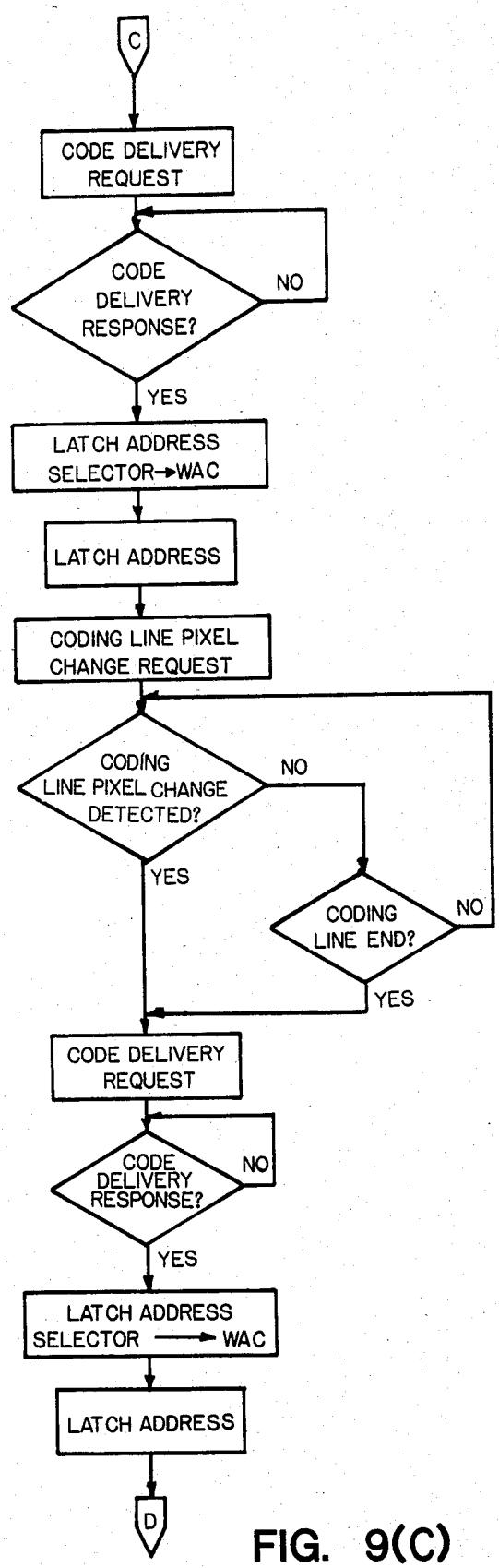
Figure 9:
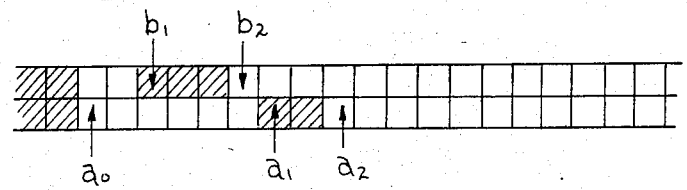
Figure 9:
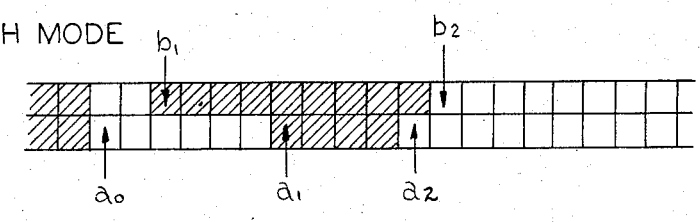
Figure 9:
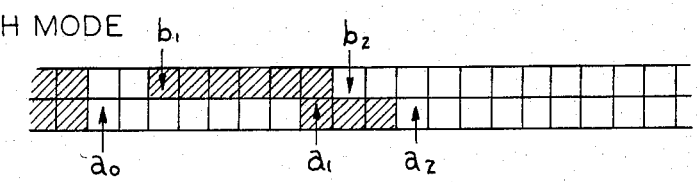
Figure 9:
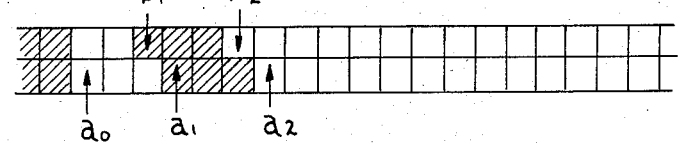
Figure 9:
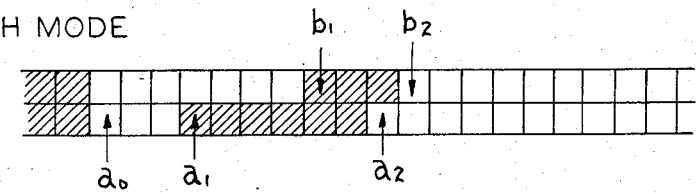
Figure 9:
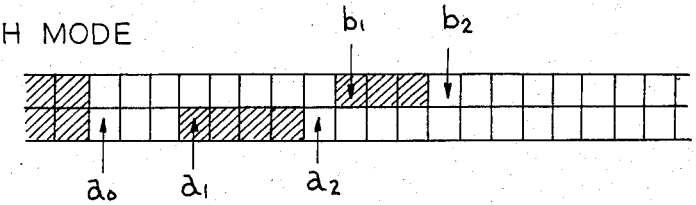

The operation shown in FIG. 9(c) is essentially similar to the operation discussed with reference to FIG. 9(b) and, therefore, a description thereof will be omitted for simplicity.

After the operation shown in FIG. 9(c), the mode control circuit 32 shifts to a status (11) in FIG. 9(a). Referring to FIG. 9(a), the mode control circuit 32 sees an output signal of the comparator 27. If $Y(a_2) - X(b_1) \geq 0$, (see FIG. 9(h)) as shown in a status (12) of FIG. 9(a), circuit 32 reads an address $Y(a_2)$ in the write address counter 21 in response to the reference address load signal, loads it in the read address counter 22, and loads the reference line pixel change detector 15 with a reference color signal taken from the coding line pixel change detector 14, thereby preparing for the detection of the next changing pixel on the reference line. The operation then shifts to the status (14) shown in FIG. 9(a). Meanwhile, if $Y(a_2) - X(b_1) < 0$, (see FIG. 9(i)) when the mode control circuit 32 checked the output of the comparator 27, it turns on the coding line pixel change request signal and then advances to the status (2).

As described above, the reference line pixel change detector 15 is loaded with a reference color signal taken from the coding line pixel change detector 14 in response to the reference address load signal. Then, detector 15 detects the next changing pixel on the reference line. In this instance, that which is detected by the detector 15 is not simply whether the received pixel is different from the immditely preceding pixel. Instead, the detector 15 refers to both the loaded reference color signal and the color signal of the reference line at the instant of the reference color loading (that is, including both the white-to-black or black-to-white change directions), thereby detecting the first pixel on the reference line which is to the right of the new starting pixel $a_0$ on the coding line and which is opposite in color to the to the pixel $a_0$.

In FIG. 10, a pixel change detector 14 for the coding line includes a D-type flip-flop 42, a D-type flip-flop 45, with a reset or clear terminal, a NAND gate 43, an inverter 44, an EX-NOR gate and an AND gate 41. First, an address clear pulse is supplied from the mode control circuit 32 to reset the flip-flop 45 in order to produce a reference color "L" level on the Q-output which is indicative of a white pixel (step (a)). When a coding line pixel change request signal supplied from the mode control circuit 32 turns ON ("L" level), the input terminal 47 of the AND gate 41 goes to an "H" level. The output 48 of the AND gate turns to an "L" level if a changing picture element occurs (step (b)). The mode control circuit 32 recognizes the "L" level (ON) of the coding line pixel change detect signal, turning OFF ("H" level) the coding line pixel change request signal (step (c)).

On the change of the coding line pixel change request signal from ON to OFF, the flip-flop 45 receives a clock pulse through the flip-flop 42 and NAND gate 43. Flip-flop 45 sets a reference color "H" level on the Q-output, which is opposite to the current color (step (d)). Timing charts of those signals are illustrated in FIG. 11. While the above sequences are repeated, it is noted that the mode control circuit 32 determines whether or not the coding line pixel change detect signal is ON during a clock pulse time after tuning ON the coding line pixel change request.

Figure 12:
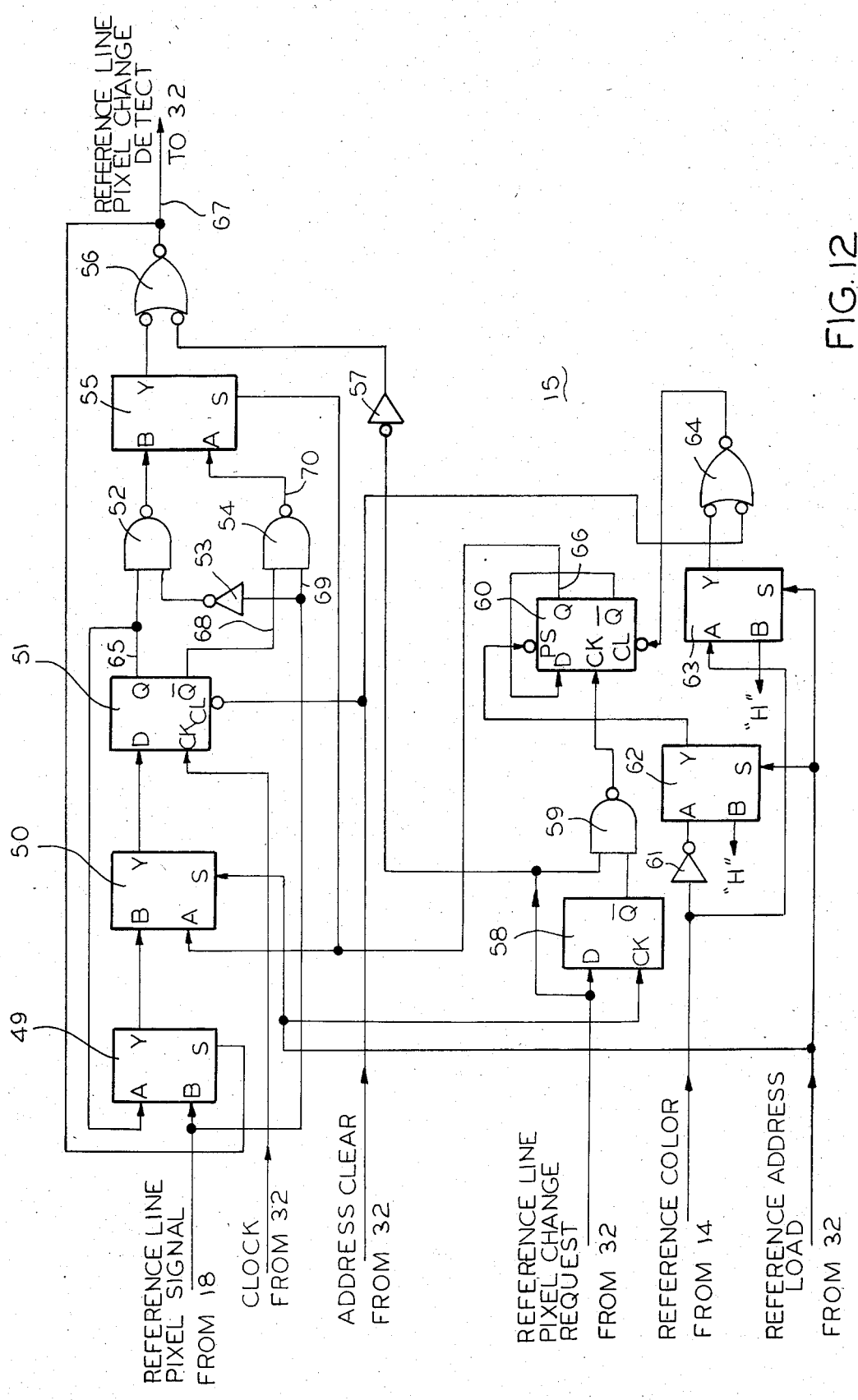
FIG. 12 illustrates a block diagram of a reference line pixel change detector for use in the present invention.

In FIG. 12, a pixel change detector 15 for the reference line includes selectors 49, 50, 55, 62 and 63, a D-type flip-flop 58, a D-type flip-flop 51 with a reset or clear terminal, a D-type flip-flop 60 with reset or clear and preset terminals, inverters 53, 57 and 61, NAND gates 52, 54 and 59, and AND gates 56 and 64.

First, an address clear pulse sent from the mode control circuit 32 resets the Q terminal 65 of the flip-flop 51 to the "L" level (white), while it resets the Q terminal 66 of the flip-flop 60 to the "L" level. When a reference line pixel change request signal turns ON ("L" level), it makes the output terminal 67 of the AND gate 67 an "H" level. Then, the selector 49 selects a reference line pixel signal. Therefore, assuming that the color of the current pixel of the reference line is black ("H" level) and the color of the immediately preceding pixel is white ("L" level), the input terminals 68 and 69 of the NAND gate 54 are at an "H" level. The output 70 of the gate 54 turns to the "L" level which makes the output 67 of the AND gate 56 an "H" level. This action occurs through the operation of selector 55.

In other words, the selector 49 selects its A terminal and maintains the level of the reference line pixel change detect signal in response to the "L" level of the reference line pixel change detect signal. When the reference line pixel change request signal turns OFF ("H" level), a clock pulse is applied through the flip-flop 58 and the NAND gate to the flip-flop 60, thus reversing the levels of the Q and $\overline{Q}$ of the flip-flop 60; Q = "H" and $\overline{Q}$ = "L" which in turn makes the selector 55 switch to its B terminal. In response to the turning on of the reference line pixel change request signal, the reference line pixel change detect signal goes to ON if the color of the current pixel of the reference line is white ("L" level) and that of the immediately preceding pixel is black.

A reference address is loaded during an OFF period of the reference line pixel change request signal. The turning ON ("L" level) of a reference address signal sets the "L" level at the Q output of the flip-flop 60 in response to a clear pulse when a reference color is white ("L" level). The Q output of flip-flop 60 is set to an "H" level when a reference color is black ("H" level). In addition, the flip-flop 51 is set to indicate the same color as the reference color which is set through the selector 50.

Figure 13:
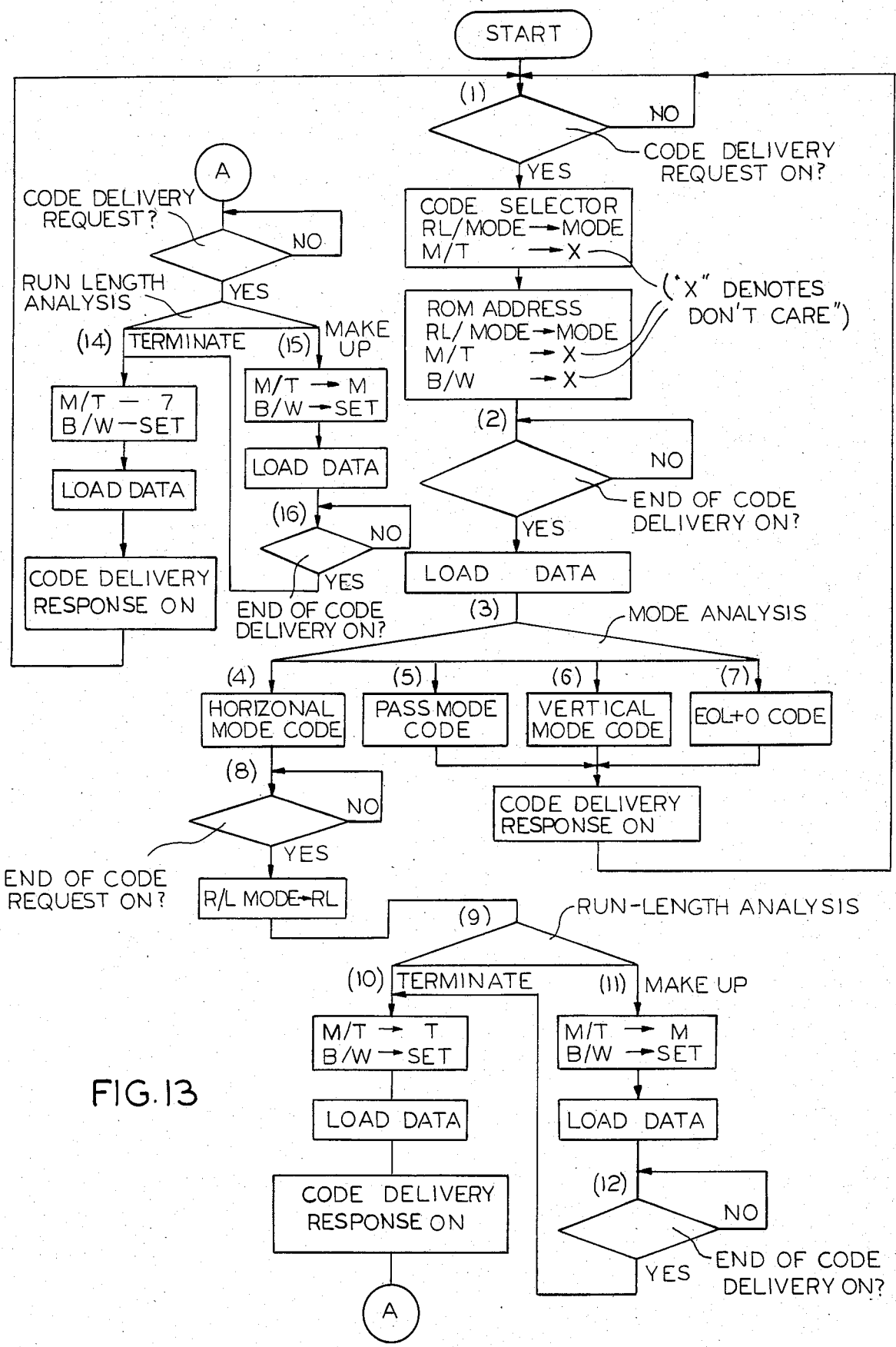
FIG. 13 is a flow chart demonstrating the operation of a coding control circuit shown in FIG. 8.

The flow chart of FIG. 13, demonstrates the explains the operation of the coding control circuit 33 shown in FIG. 8. The operation of the coding control circuit 33 will be described with reference to FIGS. 8 and 13.

First, the coding control circuit 33 is awaiting the ON state of the code delivery request signal from the mode control 32 (status 1), FIG. 13. As soon as this signal becomes "ON", the coding control circuit 33 switches the RL/Mode signal to "mode", thus causing the selector 34 to select one of the mode signals (EOL, V, H, P) among the outputs from the mode control circuit 32 and the relating address output from the adder 23. Next, the coding control circuit 33 checks whether the data which was last loaded in the shift register 36 has been completely sent out. If not, circuit 33 awaits the "ON" state of the code delivery end signal (status (2)). If the data delivery has been completed, the ROM 35 is addressed by the RL/Mode signal designating a run-length or a mode, the M/T signal designating a make-up code or a terminating code of the modified Huffman code words, the B/W signal designating a black or white pixel, and the signal output from the selector 34. Then, the coding control circuit 33 turns on the data load signal to load the shift register 36 and counter 37 with an output from the ROM 35 which is produced at this time (status (3)). The shift register 36 transforms the incoming parallel data into serial data and sends out the resulting series code. The counter 37 counts the code length and, on the completion of data delivery, notifies the coding control circuit 33.

Next, the coding control circuit 33 analyzes the mode signal (EOL, V, P, H) fed thereto from the mode control circuit 32. When the mode signal designates the pass mode (P) (status (5)), the vertical mode (V) status (6)), or the EOL mode (status (7)), the coding control circuit 33 immediately turns on the code delivery response signal and awaits a code delivery request signal.

In the case of the horizontal mode (H) status (4)), the coding control circuit 33 delivers the horizontal mode signal (001 in Table 1), and then awaits the "O" state of the code delivery end signal (status (8)). Circuit 33 turns the RL/mode signal into "RL" if the code delivery has been completed, and then analyzes a run-length output from the adder 31 (status (9)), and then makes the M/T signal a "M(make-up)". The coding control circuit 33 also sets the "color" of the run-length by means of the B/W signal. Thereafter, the coding control circuit 33 turns on the data load signal, loads the output of the ROM 35 into the shift register 36 and counter 37, and then sends out the data store in shift register 36.

The coding control circuit 33 then awaits a change of the code delivery end signal to the "ON" state (status (12)). When the change to the "ON" state occurs (status (10)), the M/T signal is switched into a "T(terminating)" signal, followed by the same procedure as that described above. This delivers the run-length of $a_0a_1$ (FIG. 1). If the analysis of the run-length (status (9)) shows that it is not longer than 63 pixels (status 10)), the coding control circuit 33 sends out the terminating code only. After loading the terminating code, the coding control circuit 33 turns on the code delivery response signal to the mode control circuit 32, and then awaits the "ON" state of the code delivery request signal from the mode control circuit 32 (status (13)). When the mode control circuit 32 has set a run-length corresponding to $a_1a_2$, the mode control circuit 32 turns on the code delivery request signal to the coding control circuit 33, so that the data is delivered by the same procedure. Thereafter, the coding control circuit 33 awaits a code delivery rquest signal (status 1)).

While the present invention has been shown and described by concentrating on the modified READ coding system, it is only illustrative and may be replaced with any other two-dimensional, sequential processing, relative address coding system.

In summary, it will be seen that the present invention provides a coding circuit which is capable of processing fasimile data at a relatively high speed. In the modified READ coding system, for example, such a high processing speed is attained by loading a read address counter (for reference pixels) with an address in a write address counter (for coding pixels). This loading occurs when an address in the read address counter is indicative of an address of a past changing pixel on a reference line which has been detected as being in a position which is to the left of an address in the write address counter. That write indicative of an address of a new starting pixel $a_0$.

The two-dimensional coding described above may be performed with a combination of a random logic circuit, such as TTL and a ROM storing a code table, or with firmware which uses a microprocessor. If a high-speed transmission path is utilized for communications, it is effective to employ the combined random logic and ROM circuit. The two-dimensional coding is not detrimental to the high speed operation of an input/output device even if the input/output device is a CCD scanner or a laser printer capable of processing sheets of format A4 one per 2-3 seconds.

Those who are skilled in the art will readily perceive how to modify the system. Therefore, the appended claims are to be construed to cover all equivalent structures which fall within the true scope and spirit of the invention.

I claim:

1. An encoding circuit for a facsimile apparatus which sequentially encodes data by utilizing an interrelationship between a position of a first changing pixel on a scan line which is being encoded and a position of a second changing pixel on the scan line which immediately precedes the scan line being encoded, said circuit comprising:

address-controllable memory means for storing a video signal on the scan line which is being encoded;

two line memory means of a random access type for alternately storing one scan line of video signal output from the address controllable memory means each time that a new coding of data is completed on one line;

write address counter means for writing, pixel by pixel, the video signal output from the address controllable memory into one line of the two line memory means;

read address counter means for reading a video signal on the preceding line which is written into the other line of the two line memory means responsive to the write address counter means;

selector means operated responsive to a completion of the reading of one scan line for switching the writing responsive to the write address counter means and the reading responsive to the read address counter means in the two line memory means so that the reading and writing occur alternately in the two line memory means, each time that the reading is completed on one scan line;

first circuit means for checking, pixel by pixel, a video signal supplied thereto from the address-controllable memory to detect the first changing pixel;

second circuit means responsive to a video signal read from one of the two line memories under the control of the read address counter for detecting a second changing pixel;

means for generating a relative address responsive to a comparison of an address of the write address counter which is indicative of a position of the first changing pixel and an address of the read address counter which is indicative of a position of the second changing pixel; and means responsive to the generated relative address satisfying a predetermined condition for loading the read address counter with the address of the write address counter.

2. An encoding circuit for a facsimile apparatus which sequentially encodes data by utilizing an interralationship between a position of a first changing pixel on a scan line which is being encoded and a position of a second changing pixel on the scan line which immediately precedes the scan line being encoded, said circuit comprising address controlled means for storing scan lines of video signals to be encoded, said video signals being picked up by said facsimile apparatus; memory means having a two line storage means for alternately storing and reading said scan lines of said video signals being encoded, each of the two lines of said two line storage means having an address storing location; write address counter means for storing write addresses and read address counter means for storing read addresses; selector means for alternately selecting between said two line storage means responsive to said write addresses and said read addresses, whereby one line of said two line storage means is writing while the other line of the two line storage means is reading an vice versa; means responsive to said selector means for storing said read and write addresses in said read and write address counter means, means for checking, pixel by pixel, the video signals to detect said first changing pixel and said second changing pixel; means for generating relative addresses responsive to a comparison between the write address of said first changing pixel and the write address of the second changing pixel; and means responsive to said relative address satisfying a predetermined condition for loading said write address into said read address counter means.

3. The circuit of claim 2 further comprising a means responsive to each complete reading from said one line of said two line storage means for operating said selector means.

4. The circuit of claim 2 wherein the addresses of said first changing pixel are taken relative to the adresses of the second changing pixels in the immediately adjacent ones of said scan lines.

5. The circuit of claim 2 further comprising a read only memory means storing a table of codes, and means responsive to a signal based on said first changing pixel and said second changing pixels for selecting a code from the table of codes stored in said read only memory means.

6. The circuit of claim 5 further comprising means for detecting a run length between said first changing pixel and said second changing pixels, and means responsive to said detected run length for reading a corresponding code from said table stored in said read only memory means.

7. The circuit of claim 2 wherein said address controlled means for storing scan lines comprise a random access memory.

8. The circuit of claim 7 further comprising a read clock means for driving said random access memory means to deliver said stored scan line, pixel by pixel to said two line storage means.

9. An encoding circuit for a facsimile apparatus which sequentially encodes data by utilizing an interrelationship between a position of a changing pixel on a coding line which is being encoded and a position of a changing pixel on a reference line which immediately precedes the coding line that is being encoded, wherein said changing pixel is defined as an element having a color which is different from the color of the previous element along the same line, and wherein an element $a_0$ is a reference element, element $a_1$ is the next changing element to the right of element $a_0$ on the coding line, element $a_2$ is the next changing element to the right of element $a_1$ on the coding line, element $b_1$ is the first changing element on the reference line to the right of element $a_0$ and of a color which is opposite to the color of element $a_0$, and element $b_2$ is the next changing element to the right of element $b_1$ on the reference line, said encoding circuit comprising:

address-controllable memory means for storing a video signal;

two line memory means of a random access type for alternately storing one scan line of a video signal output from the address controllable memory means each time that a new coding of data is completed on one line;

write address counter means for writing, pixel by pixel, the video signal output from the address controllable memory into one line of the two line memory means wherein $Y(a_1)$ and $Y(a_2)$ are defined as addresses to one of said line memories in which elements $a_1$ and $a_2$ are to be written, respectively;

read address counter means for reading a video signal on the preceding line which is written into the other of the two line memory means responsive to the address counter means wherein $X(b_1)$ and $X(b_2)$ are defined as addresses to the other of said line memories from which elements $b_1$ and $b_2$ are to be read, respectively;

selector means operated responsive to a completion of the reading of one scan line for switching the writing responsive to the write address counter means and the reading responsive to the read address counter means in the two line memory means so that the reading and writing occur alternately in the two line memory means, each time that the reading is completed on one scan line;

first circuit means for checking, pixel by pixel, the video signal output supplied thereto from the address-controllable memory to detect the first changing pixel;

second circuit means responsive to a video signal read from one of the two line memories under the control of the read address counter for detecting a second changing pixel;

means for generating a relative address responsive to a comparison of an address of the write address counter which is indicative of a position of the first changing pixel and an address of the read address counter which is indicative of a position of the second changing pixel; and means responsive to the generated relative address satisfying a predetermined condition for loading the read address counter with the address of the write address counter, said predetermined condition including either detections of $Y(a_1)-X(b_1)>3$, next $Y(a_1)-X(b_2)\leq 0$, and then $Y(a_2)-X(b_2)>0$, or detections of $Y(a_1)-X(b_1)\geq 3$, and then $Y(a_2)-X(b_1)>0$.

* * * * *